United States Patent
Dhotre et al.

(10) Patent No.: US 12,536,104 B2
(45) Date of Patent: Jan. 27, 2026

(54) USING SPECIAL DATA STORAGE PARAMETERS WHEN STORING COLD STREAM DATA IN A DATA STORAGE DEVICE

(71) Applicant: Sandisk Technologies, Inc., Milpitas, CA (US)

(72) Inventors: Piyush A. Dhotre, San Jose, CA (US); Leeladhar Agarwal, Fremont, CA (US); Adam Noah Jacobvitz, Mountain View, CA (US); Niles Yang, Mountain View, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/410,238

(22) Filed: Jan. 11, 2024

(65) Prior Publication Data

US 2025/0231884 A1    Jul. 17, 2025

(51) Int. Cl.
*G06F 12/0891* (2016.01)
*G06F 12/0846* (2016.01)

(52) U.S. Cl.
CPC ...... *G06F 12/0891* (2013.01); *G06F 12/0848* (2013.01)

(58) Field of Classification Search
CPC .................. G06F 12/0848; G06F 12/0891
See application file for complete search history.

(56) References Cited

U.S. PATENT DOCUMENTS

| | | | |
|---|---|---|---|
| 2016/0170870 A1* | 6/2016 | Camp ............... | G06F 12/0246 711/103 |
| 2016/0179386 A1* | 6/2016 | Zhang .............. | G06F 12/0246 711/103 |
| 2019/0243771 A1* | 8/2019 | Mittal .............. | G06F 3/0685 |
| 2019/0377494 A1* | 12/2019 | Rao ................ | G06F 12/0246 |
| 2020/0104048 A1* | 4/2020 | Habbinga .......... | G06F 3/064 |
| 2021/0004169 A1* | 1/2021 | Igahara ............ | G06F 3/0619 |
| 2022/0164111 A1* | 5/2022 | Yang ............... | G06F 3/0685 |

* cited by examiner

*Primary Examiner* — Aracelis Ruiz
(74) *Attorney, Agent, or Firm* — DENTONS Durham Jones Pinegar

(57) ABSTRACT

A stream classification system of a data storage device monitors an access frequency of data stored by the data storage device. If the data is classified as cold data, the stream classification system rewrites the cold data to a primary storage partition using one or more special data storage parameters. The one or more special data storage parameters cause the cold data to be more resilient to various data storage issues including, but not limited to, data retention issues, read disturb issues and/or temperature cross issues.

20 Claims, 4 Drawing Sheets

USING SPECIAL DATA STORAGE PARAMETERS WHEN STORING COLD STREAM DATA IN A DATA STORAGE DEVICE

BACKGROUND

A multi-stream data storage device is a data storage device for which a host device creates and/or opens one or more streams in the data storage device. When the streams are open, the host sends various commands, such as write commands, and associated data, to the data storage device via a particular stream. As the data is received by the data storage device, the data storage device writes the received data to physically related memory blocks. The host can also read data associated with the various streams.

However, some of the streams are accessed more frequently when compared to other streams. Streams that are frequently accessed are referred to as hot streams while streams that are accessed infrequently are referred to as cold streams. Data associated with cold streams is more susceptible to various data storage issues, such as data retention issues, read disturb issues and temperature cross issues.

Although cold streams are more susceptible to these various data storage issues, data associated with cold streams is written to the data storage device using the same data storage parameters as data associated with hot streams. For example, the data storage parameters are typically optimized for a general case and do not account for the access frequency of the data.

Accordingly, it would be beneficial for a data storage device to identify and store data associated with cold streams in a manner that causes the data to be more resilient to the various data storage issues previously described.

SUMMARY

The present disclosure describes identifying and/or classifying stream data. When the stream data is identified or classified as being cold, one or more custom or special data storage parameters are used when the cold data is rewritten to the data storage device. In an example, the special data storage parameters help make the cold stream data more resilient to data storage issues when compared with current solutions.

However, when the data is classified as hot (or is otherwise associated with a hot stream), the hot stream data is stored in a special partition (referred to as a stream cache partition) of the data storage device. In an example, the stream cache partition cache is associated with its own eviction policies that specify when data associated with particular hot streams is written to a primary storage partition of the data storage device.

Accordingly, examples of the present disclosure describe a method that includes determining an access frequency of stream data stored by a data storage device. In an example, the access frequency is based, at least in part, on a particular time window. Additionally, the stream data is written to the data storage device using a first set of data storage parameters. The stream data is then classified based, at least in part, on the determined access frequency. If the stream data has a particular classification, the stream data is rewritten using a second set of data storage parameters. In an example, the second set of data storage parameters is associated with the particular classification.

The present disclosure also describes a data storage device that includes a first memory partition and a second memory partition. The data storage device also includes a stream classification system that is operable to determine an access frequency of stream data stored by the data storage device during a time window. In an example, the stream data is associated with a first set of data storage parameters. The stream data is classified based, at least in part, on the determined access frequency. The stream data is rewritten to the first memory partition based, at least in part, on the stream data having a first classification. However, the stream data is rewritten to the second memory partition based, at least in part, on the stream data having a second classification. In an example, the stream data is rewritten to the second memory partition using a second set of data storage parameters that are associated with the second classification.

Other examples describe a data storage device that includes means for determining an access frequency of stream data stored by a data storage means. In an example, the stream data is associated with a first set of parameters. The data storage device also includes means for classifying the stream data based, at least in part, on the determined access frequency. The data storage device also includes means for rewriting the stream data to the data storage device using a second set of data storage parameters based, at least in part, on the stream data being classified with a particular classification by the means for classifying. In an example, the second set of data storage parameters are associated with the particular classification.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
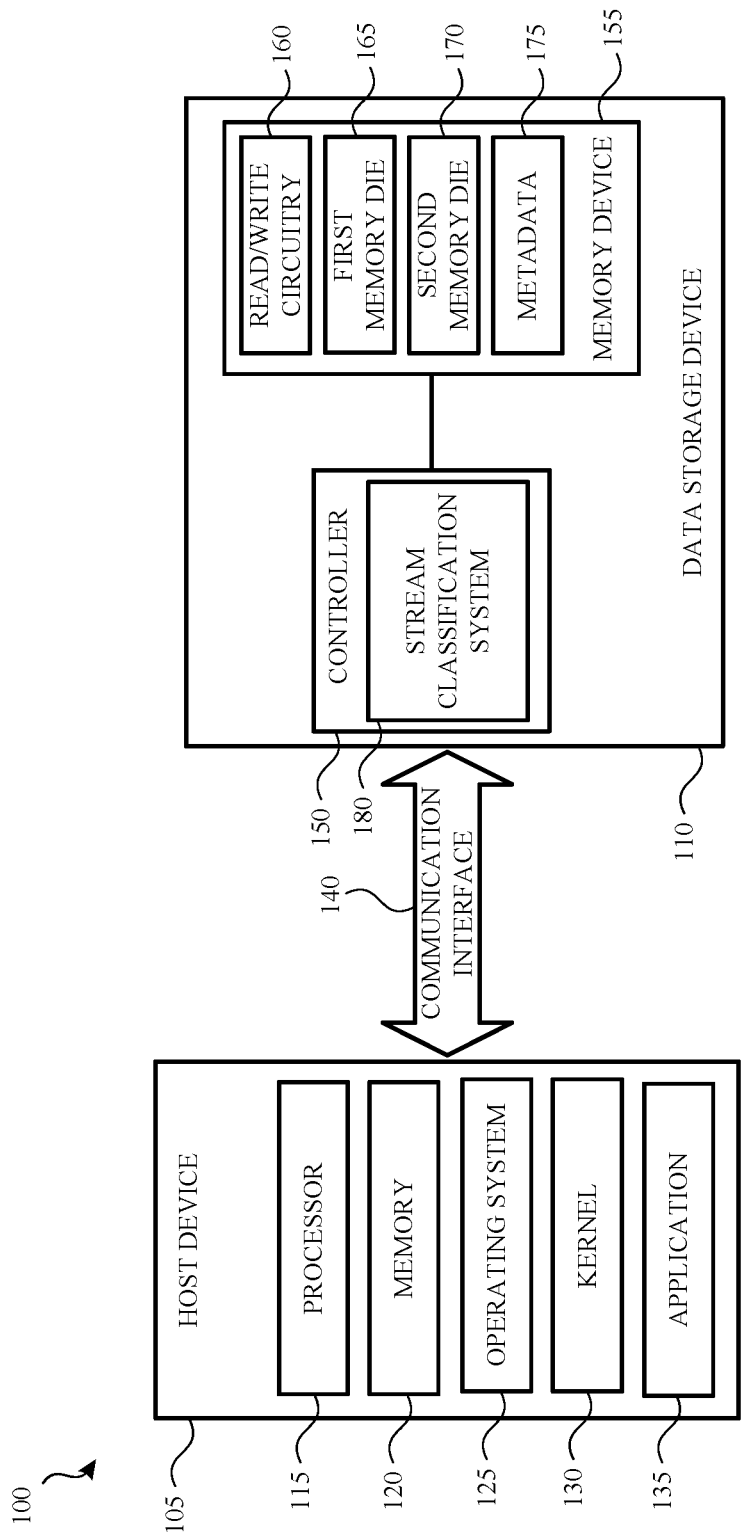
FIG. 1 is a block diagram of a system that includes a host device and a data storage device according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

A multi-stream data storage device is a data storage device for which a host device creates and/or opens one or more streams in the data storage device. When the streams are open, the host sends various commands, such as write commands, and associated data, to the data storage device via a particular stream. As the data is received by the data storage device, the data storage device writes the received data to physically related memory blocks. The host can also read data associated with the various streams.

However, some of the streams are accessed more frequently when compared to other streams. The access frequency typically depends on the application. For example, in a video game application, game data is typically classified as cold stream data (as it is rarely updated and/or accessed) while game play data is classified as hot stream data (as it is frequently updated and/or accessed). The frequent reading of hot stream data may cause memory blocks that store the hot stream data to go through a number of read/scrub processes which may result in the need to move cold stream data to other memory blocks.

However, as previously mentioned, cold stream data is accessed or updated infrequently and as a result, is more susceptible to data retention issues, read disturb issues and temperature cross issues. Thus, when cold stream data is rewritten to other memory blocks, it would be beneficial to use special data storage parameters (e.g., data storage parameters that account for the access frequency of the data) to help make the cold stream data more resilient to the various data storage issues.

Accordingly, examples of the present disclosure describe identifying and/or classifying stream data. When the stream data is identified or classified as being cold, one or more custom or special data storage parameters are used when the cold data is rewritten to a primary storage partition of the data storage device. In an example, the special data storage parameters help make the cold stream data more resilient to data storage issues when compared with current solutions.

However, when the data is classified as hot (or is otherwise associated with a hot stream), the hot stream data is stored in a special partition referred to as a stream cache partition of the data storage device. In an example, the stream cache partition is associated with its own eviction policies that specify when data associated with particular hot streams is written to the primary storage partition of the data storage device.

Accordingly, many technical benefits may be realized including, but not limited to, reducing the amount of data relocation required for cold data and reducing the amount of data that is rewritten during background operations, each of which increases the lifetime of the data storage device.

These benefits, along with other examples, will be shown and described in greater detail with respect to FIG. 1-FIG. 5.

FIG. 1 is a block diagram of a system 100 that includes a host device 105 and a data storage device 110 according to an example. The host device 105 includes a processor 115 and a memory 120 (e.g., a main memory). The memory 120 includes or is otherwise associated with an operating system 125, a kernel 130 and/or an application 135.

In an example, the data storage device 110 is attached to or embedded within the host device 105. In another example, the data storage device 110 is an external device or a portable device that is communicatively or selectively coupled to the host device 105. In yet another example, the data storage device 110 is a component (e.g., a solid-state drive (SSD)) of a network accessible data storage system, a network-attached storage system, a cloud data storage system, and the like.

The processor 115 executes various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space maps to locations in the memory 120. The operating system 125 may also include or otherwise be associated with a kernel 130. The kernel 130 includes instructions for managing various resources of the host device 105 (e.g., memory allocation), handling read and write operations and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

In an example, the data storage device 110 includes a controller 150 and a memory device 155. The controller 150 is communicatively coupled to the memory device 155. In an example, the memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, the memory device 155 includes multiple partitions. For example, the memory device 155 includes a first partition and a second partition. The first partition is a cache partition and the second partition is a primary storage partition. When data is written to the memory device 155, it is typically written in the cache partition first. The data may then be transferred to the primary storage partition.

The cache partition includes memory blocks of a first type and the primary storage partition includes memory blocks of a second type. For example, the cache partition includes a number of SLC memory blocks and the primary storage partition includes a number of QLC memory blocks 240.

Although QLC memory blocks and SLC memory blocks are specifically mentioned, each partition may include different types of memory blocks.

As previously explained, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also stores metadata 175 and includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

Each of the first memory die 165 and the second memory die 170 may include one or more memory blocks. In an example, each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

The memory blocks are referred to herein as physical memory blocks because they relate to groups of physical memory cells. As used herein, a logical memory block is a virtual unit of address space defined to have the same size as a physical memory block. Each logical memory block includes a range of logical memory block addresses (LBAs) that are associated with data received from the host device 105. The LBAs are then mapped to one or more physical memory blocks in the data storage device 110 where the data is physically stored.

As previously described, the data storage device 110 also includes a controller 150. The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 also receives data and/or instructions/commands from the host device 105. The controller 150 may also cause data to be sent to the host device 105. For example, the controller 150 may send data to and/or receive data from the host device 105 via the communication interface 140. The controller 150 also sends data and/or commands to and/or receives data from, the memory device 155.

When the controller 150 receives data and/or commands, the controller 150 causes the commands to be executed on one or more of the memory dies in the memory device 155. For example, if the command is a write command, the controller 150 causes the memory device 155 to store data associated with the command at a specified physical address or memory block of the memory device 155. If the command is a read command, the controller 150 causes data to be read from the specified physical address of the memory device 155. The controller 150 may also execute various system commands and/or other background operations. These commands and/or operations include background scanning operations, garbage collection operations, and/or wear leveling operations.

In an example, the host device 105 opens one or more streams in the data storage device 110. As the data is received, the data is stored in logically contiguous memory blocks or regions of the memory device 155. Each stream is associated with a stream identifier and an amount of data that is to be written to the stream.

In an example, the data associated with the stream is video game data. Although video game data is specifically mentioned, the examples described herein can be used for any type of data. A video game is typically composed of multiple streams. Some of the streams are associated with background data while other streams are associated with the actual game play. In example, the background data is typically cold data-meaning it is rarely updated, if ever. However, the game play data is read and/or updated frequently. As such, it is referred to as hot data.

As previously described, in current solutions, cold data and hot data are written to the memory device using the same or similar data storage parameters. However, cold data is more susceptible to various data storage issues such as data retention, read disturb and temperature cross when compared to hot data.

In an example, data retention refers to the degradation of data stored in the memory device 155 due to time effects. Read disturb refers to the degradation of data stored in the memory device 155 due to repeated reads on neighboring locations within the same memory block. Temperature cross refers to the degradation of data stored in the memory device 155 due to reading a temperature that is different than the temperature at which a wordline of the memory die was programmed.

To help the cold data become more resilient to theses data storage issues, the controller 150 includes a stream classification system 180. In an example, the stream classification system 180 analyzes an access frequency of data that is stored in the memory device 155 and classifies the data as either cold stream data (also referred to as cold data) or hot stream data (also referred to as hot data). Based on the classification, each type of data is treated and/or stored differently.

For example, during a particular time window, the stream classification system 180 analyzes one or more data streams to determine whether the data stream should be classified as hot stream data or cold stream data. In an example, the determination of whether the data stream is hot stream data or cold stream data is based, at least in part, on a number of times the data was written to the data stream and/or read from the data stream (referred to as an access frequency). When the access frequency of the data stream for a particular time window is determined, the stream classification system 180 classifies the data stream as either a hot stream data or a cold stream data. In some examples, the data stream can be classified as a hot stream data in one time window and be classified as a cold stream data in a second, different time window.

If the stream classification system 180 classifies the data stream as a cold steam data (e.g., the data stream is rarely or infrequently read from/written to), the cold stream data is written from a first location in the memory device 155 (e.g., from a cache partition) to a second location in the memory device 155 (e.g., to a primary storage partition) during a rewrite operation. As part of the rewrite operation, the cold stream data is written using one or more special data storage parameters.

For example, if a data stream is rarely accessed (e.g., for reads) during a particular time window, the data stream is evicted from the cache partition (if the data stream hasn't already been evicted from the cache partition). The data stream is then written, with special parameters, to the primary storage partition. For example, if the data stream is degraded due to data retention issues and/or temperature cross issues, the stream classification system 180 will check to see if the data steam is cold. If the data stream is cold, the data stream is rewritten to the primary storage partition using the special parameters. However, if the data stream is not classified as cold, it will be written to the primary storage partition in a normal manner.

In an example, the special data storage parameters include, but are not limited to, writing the cold stream data using more pulses and/or more precise pulses when compared to how the cold stream data was originally written; increasing a threshold voltage associated with a programmed state of a memory block in which the cold stream data is written; decreasing a threshold voltage associated with an erased state of the memory block in which the cold stream data is written and reducing a programming speed. Although specific examples are given, other data storage parameters may be used.

The stream classification system 180 (or firmware associated with the controller 150 and/or the stream classification system 180) also tracks or determines a program/erase cycle (PEC) count for one or more memory blocks of the memory device 155. In an examples, when the cold stream data is rewritten, the cold stream data is written (using the special data storage parameters) to memory blocks in the primary storage partition having a highest number of PECs and/or to memory blocks having over a threshold number of PECs. Because cold stream data is infrequently refreshed or rewritten, storing the cold stream data in memory blocks with higher PECs helps prevent the PECs of these memory blocks from getting larger. As a result the lifetime of the memory device 155 increases when compared with current solutions.

As previously mentioned, the stream classification system 180 may also classify data as hot stream data. Typically, hot stream data is more resilient to the various data storage issues mentioned above. In an example, hot stream data is stored in the cache partition of the memory device 155. Reads from the cache partition occur more frequently than reads from the primary storage partition. As such, data stored in the cache partition is less susceptible to read disturb effects and the other data storage issues.

However, because the hot stream data is read more frequently than cold stream data, the memory device 155 includes a special cache partition, referred to as a stream cache partition, in which hot stream data is stored. In this example, when the stream classification system 180 classifies a data stream as hot stream data, the stream classification system 180 associates a read/write/update counter to the hot stream data. The read/write/update counter tracks a number of times the hot stream data is read, written to and/or updated.

When the stream cache partition is getting full, the stream classification system 180 checks the read/write/update counter of each hot stream. Based on an eviction policy and/or the read/write/update counter, data associated with a hot stream data that was the least recently used/accessed is transferred from the stream cache partition to the primary storage partition. Although the example eviction policy states that the least recently used/accessed data is transferred, the eviction policy may state that the most recently used/accessed data is evicted from the stream cache partition. In another example, the eviction policy may cause the data to be evicted from the stream cache portion to the primary storage partition when the data is updated.

Figure 2:
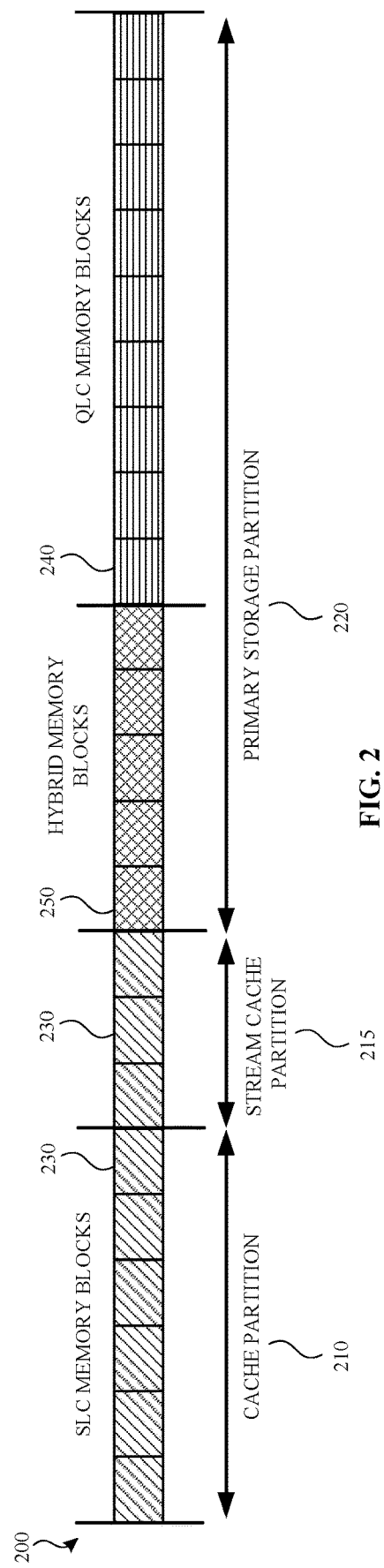
FIG. 2 illustrates a memory device having a first partition and a second partition according to an example.

FIG. 2 illustrates a memory device 200 having a first partition and a second partition according to an example. In an example, the memory device 200 is similar to the memory device 155 shown and described with respect to FIG. 1.

As previously indicated, the memory device 200 has two partitions. In an example, the first partition is a cache partition 210 and the second partition is a primary storage partition 220. The cache partition 210 includes memory blocks of a first type. For example, the cache partition 210 includes a number of SLC memory blocks 230. The primary storage partition 220 includes memory blocks of a second type. For example, the primary storage partition 220 includes a number of QLC memory blocks 240.

In an example, the memory device 200 may also implement a hybrid architecture. As such, the memory storage device 200 includes a number of hybrid memory blocks 250. The hybrid memory blocks 250 may be QLC memory blocks that are part of the primary storage partition 220. However, the hybrid memory blocks 250 may be programmable in different modes. For example, the hybrid memory blocks 250 may be programmable in a SLC mode or a QLC mode. When the hybrid memory blocks 250 are programmed in the QLC mode, they are included in the primary storage partition 220. However, when the hybrid memory blocks 250 are programmed in the SLC mode, they may be included, along with the SLC memory blocks 230, as part of a hybrid cache 260.

The memory device 200 also includes a stream cache partition 215. In an example, the stream cache partition 215 also includes one or more SLC memory blocks 230. The stream cache partition 215 is reserved for data that is classified (e.g., by a stream classification system) as hot or as hot stream data. In an example, the data is first written to the primary storage partition 220. However, when the data is classified as hot, the data is copied from the primary storage partition 220 to the stream cache partition 215. However, if there is a write to the data, the entry in the stream cache partition 215 is invalidated and the associated data in the primary storage partition 220 is updated.

In an example, when stream data is received, it is stored in the cache partition 210. A stream classification system (e.g., the stream classification system 180 (FIG. 1)) analyzes an access frequency of data stored in the cache partition to determine whether the stream data is hot or cold. In an example, the classification is associated with a particular time window.

If the stream classification system determines, based at least in part, on the access frequency of the data, that the data is cold, the data is written to the primary storage partition 220. In an example, when the cold stream data is written to the primary storage partition 220, one or more special data storage parameters are used to write the data. The special data storage parameters help make the cold stream data more resilient to read disturb issues, data retention issues and/or temperature cross issues.

In an example, the special data storage parameters include, but are not limited to, using a smaller program voltage, using a smaller step size, using a slower programming speed, upshifting an A state (e.g., increasing the threshold voltage of the memory block/cell such that it indicates the presence of stored charge, representing a logical 1) of a programmed bit and/or upshifting a G state (e.g., increasing the threshold voltage of the memory block/cell such that it indicates the absence of stored charge, representing a logical 0).

In an example, the stream classification system writes the cold data into one or more memory blocks of the primary storage partition 220 having the highest number of PECs (or over a threshold amount of PECs). Because the cold data is infrequently accessed/updated, the PECs of these memory blocks will not be increased as often, which extends the lifetime of the memory device 200.

If the stream classification system determines, based at least in part, on the access frequency of the data, that the data is hot, the data is written to into the stream cache partition 215. In an example, the stream cache partition 215 is associated with its own, unique eviction policy that is separate from an eviction policy associated with the cache partition 210.

For example, when the stream cache partition 215 is reaching capacity, hot data that was the least recently used/accessed may be moved from the stream cache partition 215 to the primary storage partition 220. In another example, if data stored in the stream cache partition is updated, it is moved to the primary storage partition 220. Although specific examples are given, data may be moved from the stream cache partition 215 to the primary storage partition based on other factors.

In another example, the stream classification system may determine that received data is system data. The system data could be operating system data, file system data and the like. In such examples, the system data is classified as cold data. As such, the system data would be stored in the primary storage partition 220.

Figure 3:
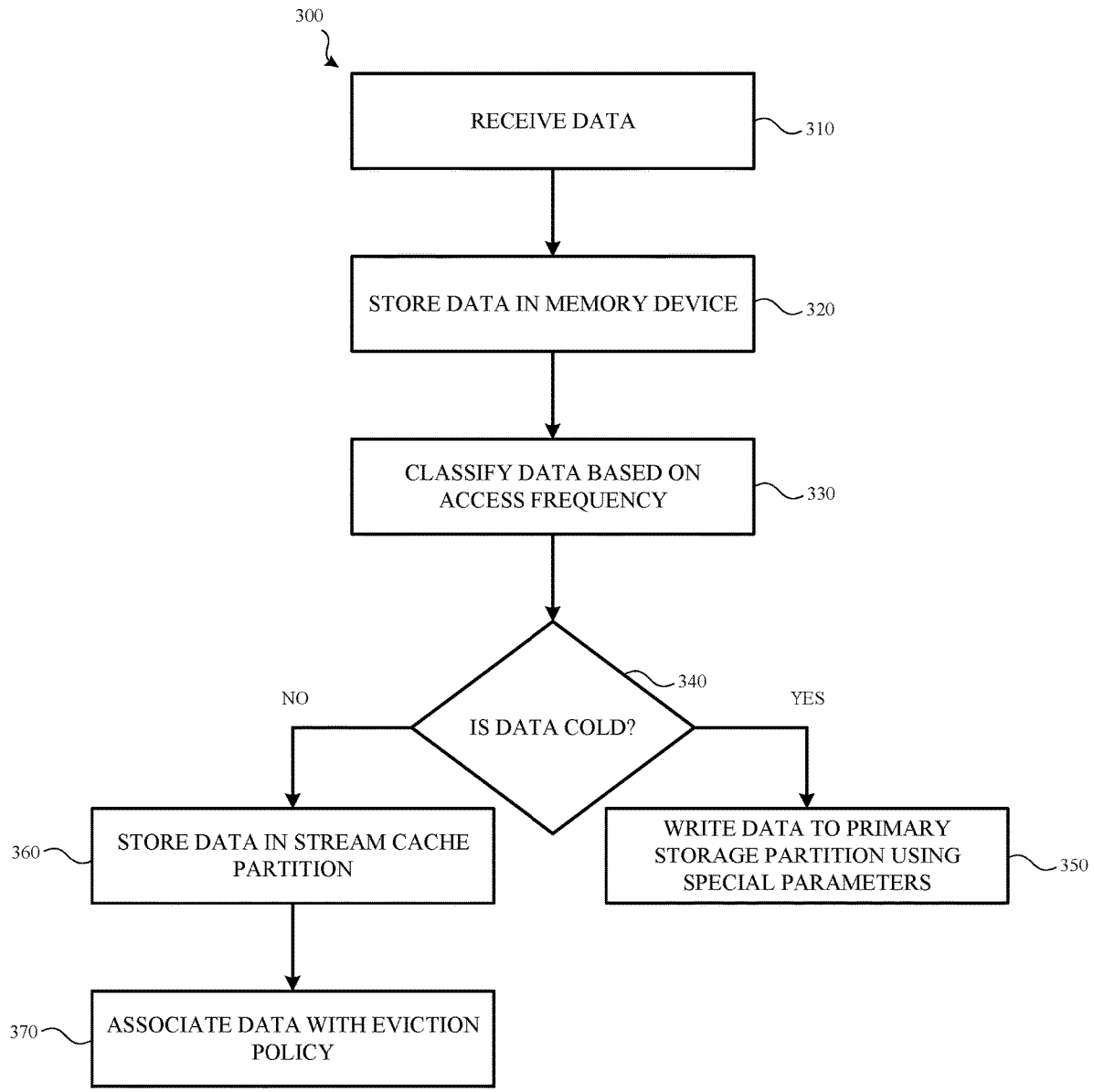
FIG. 3 illustrates a method for classifying and storing data according to an example.

FIG. 3 illustrates a method 300 for classifying and storing data according to an example. In an example, the method 300 is performed by a controller and/or a stream classification system such as, for example, the controller 150 and/or the stream classification system 180 shown and described with respect to FIG. 1.

The method 300 begins when data is received (310). In an example, the data is associated with one or more streams. In another example, the data is video game data and includes game play data and/or background data. In yet another example, the data is file system data and/or operating system data. Regardless of the type, in some examples, some of the data will be read/written/updated frequently while other portions of the data will be read/written/updated infrequently.

In an example, when the data is received, it is stored (320) in a first partition of a memory device (e.g., a cache partition 210 of a memory device 200 (FIG. 2)). When the data stored, the stream classification system monitors an access frequency of the data. In an example, the access frequency is based, at least in part, on a particular time window. The time window can have any size/time period and is based, at least in part, on how often data is moved and/or updated. For example, smaller time windows provide frequent updates while larger time windows would decrease the frequency of the updates.

The stream classification system classifies (330) the data based, at least in part, on the determined or identified access frequency. For example, if the data is infrequently accessed, the stream classification system classifies the data as cold. However, if the data is frequently accessed, the data is classified as hot.

The stream classification system then determines (340) whether the data is classified as hot or cold. In an example, if the data is classified as cold, the data is written (350) to a primary storage partition of the memory device. In an example, the cold data is written to the primary storage partition using one or more special data storage parameters that cause the data to be more resilient to one or more data storage issues. These data storage issues include, but are not limited to, data retention issues, read disturb issues and/or cross temperature issues. Additionally, the stream classification system writes the cold data to one or more memory blocks with the highest number of PECs (or memory blocks having over a threshold number of PECs).

However, if the stream classification system determines the data is hot (or is not cold), the data is stored (360) in a stream cache partition. The data is then associated (360) with an eviction policy that specifies when the data is to be written to the primary storage partition such as previously described.

Figure 4:
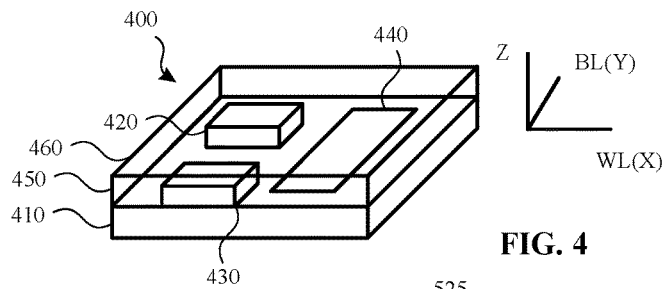
FIG. 4 is a perspective view of a storage device that includes three-dimensional (3D) stacked non-volatile memory according to an example.
Figure 5:
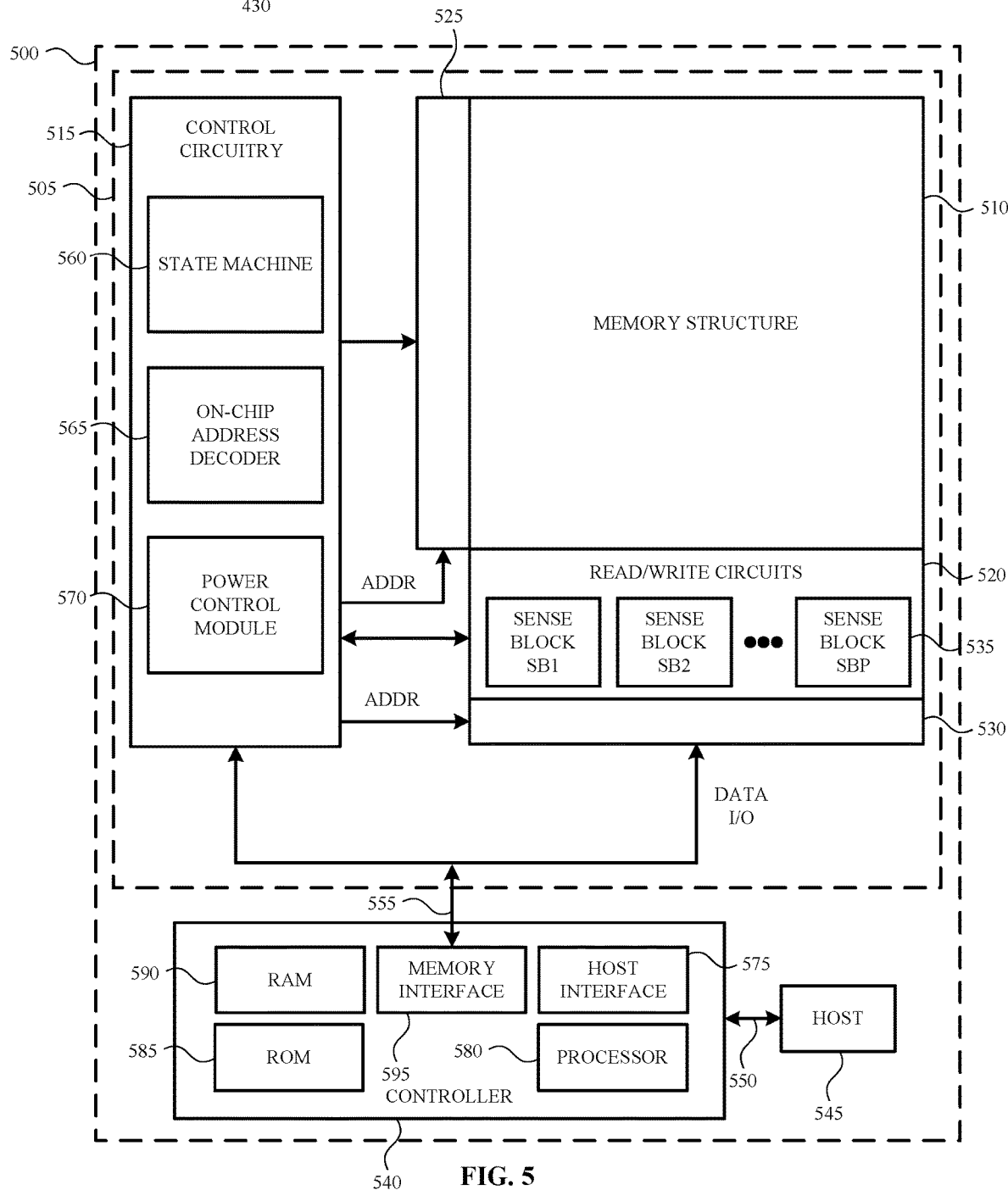
FIG. 5 is a block diagram of a data storage device according to an example.

FIG. 4-FIG. 5 describe example storage devices that may be used with or otherwise implement the various features described herein. For example, the storage devices shown and described with respect to FIG. 4-FIG. 5 may include various systems and components that are similar to the systems and components shown and described with respect to FIG. 1. For example, the controller 540 shown and described with respect to FIG. 5 may be similar to the controller 150 of FIG. 1. Likewise, the memory dies 505 may be similar to the first memory die 165 and/or the second memory die 170 of FIG. 1.

FIG. 4 is a perspective view of a storage device 400 that includes three-dimensional (3D) stacked non-volatile memory according to an example. In this example, the storage device 400 includes a substrate 410. Blocks of memory cells are included on or above the substrate 410. The blocks may include a first block 420 (BLK0) and a second block 430 (BLK1). Each block may be formed of memory cells (e.g., non-volatile memory elements). The substrate 410 may also include a peripheral area 440 having support circuits that are used by the first block 420 and the second block 430. The peripheral area 440 may be located beneath the first block 420 and the second block 430. In another example, the peripheral area may be included on a different substrate or die.

The substrate 410 may also carry circuits under the blocks, along with one or more lower metal layers which are patterned in conductive paths to carry signals from the circuits. The blocks may be formed in an intermediate region 450 of the storage device 400. The storage device may also include an upper region 460. The upper region 460 may include one or more upper metal layers that are patterned in conductive paths to carry signals from the circuits. Each block of memory cells may include a stacked area of memory cells. In an example, alternating levels of the stack represent wordlines. While two blocks are depicted, additional blocks may be used and extend in the x-direction and/or the y-direction.

In an example, a length of a plane of the substrate 410 in the x-direction represents a direction in which signal paths for wordlines or control gate lines extend (e.g., a wordline or drain-end select gate (SGD) line direction) and the width of the plane of the substrate 410 in the y-direction represents a direction in which signal paths for bit lines extend (e.g., a bit line direction). The z-direction represents a height of the storage device 400.

FIG. 5 is a functional block diagram of a storage device 500 according to an example. In an example, the storage device 500 may be the 3D stacked non-volatile storage device 400 shown and described with respect to FIG. 4. The components depicted in FIG. 5 may be electrical circuits. In an example, the storage device 500 includes one or more memory dies 505. Each memory die 505 includes a three-dimensional memory structure 510 of memory cells (e.g., a 3D array of memory cells), control circuitry 515, and read/write circuits 520. In another example, a two-dimensional array of memory cells may be used. The memory structure 510 is addressable by wordlines using a first decoder 525 (e.g., a row decoder) and by bit lines using a second decoder 530 (e.g., a column decoder). The read/write circuits 520 may also include multiple sense blocks 535 including SB1, SB2, . . . , SBp (e.g., sensing circuitry) which allow pages of the memory cells to be read or programmed in parallel. The sense blocks 535 may include bit line drivers.

In an example, a controller 540 is included in the same storage device 500 as the one or more memory dies 505. In another example, the controller 540 is formed on a die that is bonded to a memory die 505, in which case each memory die 505 may have its own controller 540. In yet another example, a controller die controls all of the memory dies 505.

Commands and data may be transferred between a host 545 and the controller 540 using a data bus 550. Commands and data may also be transferred between the controller 540 and one or more of the memory dies 505 by way of lines 555. In one example, the memory die 505 includes a set of input and/or output (I/O) pins that connect to lines 555.

The memory structure 510 may also include one or more arrays of memory cells. The memory cells may be arranged in a three-dimensional array or a two-dimensional array. The memory structure 510 may include any type of non-volatile memory that is formed on one or more physical levels of arrays of memory cells having an active area disposed above a silicon substrate. The memory structure 510 may be in a non-volatile memory device having circuitry associated with the operation of the memory cells, whether the associated circuitry is above or within the substrate.

The control circuitry 515 works in conjunction with the read/write circuits 520 to perform memory operations (e.g., erase, program, read, and others) on the memory structure 510. The control circuitry 515 may include registers, ROM fuses, and other devices for storing default values such as base voltages and other parameters.

The control circuitry 515 may also include a state machine 560, an on-chip address decoder 565, and a power control module 570. The state machine 560 may provide chip-level control of various memory operations. The state machine 560 may be programmable by software. In another example, the state machine 560 does not use software and is completely implemented in hardware (e.g., electrical circuits).

The on-chip address decoder 565 may provide an address interface between addresses used by host 545 and/or the controller 540 to a hardware address used by the first decoder 525 and the second decoder 530.

The power control module 570 may control power and voltages that are supplied to the wordlines and bit lines during memory operations. The power control module 570 may include drivers for wordline layers in a 3D configuration, select transistors (e.g., SGS and SGD transistors) and source lines. The power control module 570 may include one or more charge pumps for creating voltages.

The control circuitry 515, the state machine 560, the on-chip address decoder 565, the first decoder 525, the second decoder 530, the power control module 570, the sense blocks 535, the read/write circuits 520, and/or the controller 540 may be considered one or more control circuits and/or a managing circuit that perform some or all of the operations described herein.

In an example, the controller 540, is an electrical circuit that may be on-chip or off-chip. Additionally, the controller 540 may include one or more processors 580, ROM 585, RAM 590, memory interface 595, and host interface 575, all of which may be interconnected. In an example, the one or more processors 580 is one example of a control circuit. Other examples can use state machines or other custom circuits designed to perform one or more functions. Devices such as ROM 585 and RAM 590 may include code such as a set of instructions. One or more of the processors 580 may be operable to execute the set of instructions to provide some or all of the functionality described herein.

Alternatively or additionally, one or more of the processors 580 may access code from a memory device in the memory structure 510, such as a reserved area of memory cells connected to one or more wordlines. The memory interface 595, in communication with ROM 585, RAM 590, and one or more of the processors 580, may be an electrical circuit that provides an electrical interface between the controller 540 and the memory die 505. For example, the memory interface 595 may change the format or timing of signals, provide a buffer, isolate from surges, latch I/O, and so forth.

The one or more processors 580 may issue commands to control circuitry 515, or any other component of memory die 505, using the memory interface 595. The host interface 575, in communication with the ROM 585, the RAM 590, and the one or more processors 580, may be an electrical circuit that provides an electrical interface between the controller 540 and the host 545. For example, the host interface 575 may change the format or timing of signals, provide a buffer, isolate from surges, latch I/O, and so on. Commands and data from the host 545 are received by the controller 540 by way of the host interface 575. Data sent to the host 545 may be transmitted using the data bus 550.

Multiple memory elements in the memory structure 510 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a RAM configuration.

One of ordinary skill in the art will recognize that the technology described herein is not limited to a single specific memory structure, but covers many relevant memory structures within the spirit and scope of the technology as described herein and as understood by one of ordinary skill in the art.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device (e.g., host device 105 (FIG. 1)). Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Based on the above, examples of the present disclosure describe a method, comprising: determining an access frequency of stream data stored by a data storage device during a particular time window, the stream data being written to the data storage device with a first set of data storage parameters; classifying the stream data based, at least in part, on the determined access frequency; and based, at least in part, on the stream data having a particular classification, rewriting the stream data using a second set of data storage parameters, the second set of data storage parameters being associated with the particular classification. In an example, rewriting the stream data using the second set of storage parameters causes the stream data to be more resilient to one or more data storage issues when compared to when the stream data was written to the data storage device with the first set of data storage parameters. In an example, the one or more data storage issues are selected from a group, comprising: data retention issues; read disturb issues; and temperature cross issues. In an example, the stream data having the particular classification is rewritten into one or more memory blocks having program erase cycles (PEC) over a PEC threshold. In an example, the second set of data storage parameters include one or more of: writing the stream data using more pulses and more precise pulses when compared to the pulses associated with the first set of data storage parameters; increasing a threshold voltage associated with a programmed state of a memory block associated with the stream data; and decreasing a threshold voltage associated with an erased state of the memory block associated with the stream data. In an example, the particular classification is a first classification and the method further comprises: based, at least in part, on the stream data having a second classification, storing the stream data in a stream cache partition of a cache partition of the data storage device, the stream cache partition being reserved for stream data having the second classification. In an example, the stream cache partition is associated with an eviction policy. In an example, the method also includes evicting the stream data having the second classification based, at least in part, on the eviction policy. In an example, the method also includes writing updated stream data having the second classification to a primary storage partition of the data storage device.

Examples also describe a data storage device, comprising: a first memory partition; a second memory partition; and a stream classification system operable to: determine an access frequency of stream data stored by the data storage device during a time window, the stream data being associated with a first set of data storage parameters; classify the stream data based, at least in part, on the determined access frequency; rewrite the stream data to the first memory partition based, at least in part, of the stream data having a first classification; and rewrite the stream data to the second memory partition based, at least in part, on the stream data having a second classification, wherein the stream data is rewritten to the second memory partition using a second set of data storage parameters that are associated with the second classification. In an example, the first memory partition includes a stream cache partition and wherein rewriting the stream data to the first memory partition comprises rewriting the stream data to the stream cache partition. In an example, the stream cache partition is associated with an eviction policy. In an example, the stream classification system is further operable to evict the stream data from the stream cache partition based, at least in part, on the eviction policy. In an example, the stream classification system is further operable to cause updated stream data having the first classification to be written to the second memory partition of the data storage device. In an example, rewriting the stream data using the second set of storage parameters causes the stream data to be more resilient to one or more data storage issues when compared to when the stream data is written to the data storage device with the first set of data storage parameters. In an example, the one or more data storage issues are selected from a group, comprising: data retention issues; read disturb issues; and temperature cross issues. In an example, rewriting the stream data to the second memory partition based, at least in part, on the stream data having a second classification comprises rewriting the stream data into one or more memory blocks having a program erase cycle (PEC) over a PEC threshold. In an example, the second set of data storage parameters include one or more of: writing the stream data using more pulses and more precise pulses when compared to the pulses associated with the first set of data storage parameters; increasing a threshold voltage associated with a programmed state of a memory block associated with the stream data; and decreasing a threshold voltage associated with an erased state of the memory block associated with the stream data.

Examples also describe a data storage device, comprising: means for determining an access frequency of stream data stored by a data storage means, the stream data being associated with a first set of parameters; means for classifying the stream data based, at least in part, on the determined access frequency; and means for rewriting the stream data to the data storage device using a second set of data storage parameters based, at least in part, on the stream data being classified with a particular classification by the means for classifying, the second set of data storage parameters being associated with the particular classification. In an example, rewriting the stream data using the second set of storage parameters causes the stream data to be more resilient to one or more data storage issues when compared to when the stream data was associated with the first set of data storage parameters.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
   determining an access frequency of stream data stored by a data storage device during a particular time window, the stream data being written to the data storage device using a first set of data storage parameters;
   classifying the stream data as at least one of hot stream data and cold stream data based, at least in part, on the determined access frequency;
   based, at least in part, on the stream data being classified as cold stream data, rewriting the stream data to a primary storage partition of the data storage device using a second set of data storage parameters that are unique to stream data that is classified as cold stream data; and
   based, at least in part, on the stream data being otherwise classified, rewriting the stream data to the primary storage partition of the data storage device using the first set of data storage parameters.

2. The method of claim 1, wherein rewriting the stream data to the primary storage partition of the data storage device using the second set of storage parameters causes the stream data to be more resilient to one or more data storage issues when compared to when the stream data is written to the primary storage partition of the data storage device with the first set of data storage parameters.

3. The method of claim 2, wherein the one or more data storage issues are selected from a group, comprising:
   data retention issues;
   read disturb issues; and
   temperature cross issues.

4. The method of claim 1, wherein at least one memory block of the primary storage partition of the data storage device to which the stream data that is classified as cold stream data is written has a program erase cycle (PEC) over a PEC threshold.

5. The method of claim 1, wherein the second set of data storage parameters include one or more of:
writing the stream data that is classified as cold stream data using one or more of more pulses and more precise pulses when compared to the pulses associated with the first set of data storage parameters;
increasing a threshold voltage associated with a programmed state of a memory block associated with the stream data that is classified as cold stream data; and
decreasing a threshold voltage associated with an erased state of the memory block associated with the stream data that is classified as cold stream data.

6. The method of claim 1, further comprising:
storing the stream data in a stream cache partition of the data storage device based, at least in part, on the stream data being classified as hot stream data, the stream cache partition being reserved for stream data that is classified as hot stream data.

7. The method of claim 6, wherein the stream cache partition is associated with an eviction policy.

8. The method of claim 7, further comprising:
evicting the stream data that is classified as hot stream data from the stream cache partition of the data storage device based, at least in part, on the eviction policy; and
rewriting the stream data that is classified as hot stream data to the primary storage partition of the data storage device using the first set of data storage parameters.

9. The method of claim 1, further comprising writing updated stream data that is classified as hot stream data to the primary storage partition of the data storage device using the first set of data storage parameters.

10. A data storage device, comprising:
a first memory partition being associated with a first set of data storage parameters;
a second memory partition being associated with the first set of data storage parameters and a second set of data storage parameters, the second set of data storage parameters being unique to stream data that is classified as cold stream data; and
a stream classification system operable to:
determine an access frequency of stream data stored by the data storage device during a time window, the stream data being stored in the first memory partition using the first set of data storage parameters;
classify the stream data as at least one of hot stream data and cold stream data based, at least in part, on the determined access frequency;
rewrite the stream data to the first memory partition using the first set of data storage parameters based, at least in part, on the stream data being classified as hot stream data; and
rewrite the stream data to the second memory partition using the second set of data storage parameters based, at least in part, on the stream data being classified as cold stream data.

11. The data storage device of claim 10, wherein the first memory partition includes a stream cache partition and wherein rewriting the stream data that is classified as hot stream data to the first memory partition comprises rewriting the stream data that is classified as hot stream data to the stream cache partition.

12. The data storage device of claim 11, wherein the stream cache partition is associated with an eviction policy.

13. The data storage device of claim 12, wherein the stream classification system is further operable to:
evict the stream data that is classified as hot stream data from the stream cache partition based, at least in part, on the eviction policy; and
cause the evicted stream data that is classified as hot stream data to be written to the second memory partition using the first set of data storage parameters.

14. The data storage device of claim 10, wherein the stream classification system is further operable to cause updated stream data that is classified as hot stream data to be written to the second memory partition using the first set of data storage parameters.

15. The data storage device of claim 10, wherein rewriting the stream data that is classified as cold stream data using the second set of storage parameters causes the stream data to be more resilient to one or more data storage issues when compared to when the stream data is written to the data storage device with the first set of data storage parameters.

16. The data storage device of claim 15, wherein the one or more data storage issues are selected from a group, comprising:
data retention issues;
read disturb issues; and
temperature cross issues.

17. The data storage device of claim 10, wherein rewriting the stream data that is classified as cold stream data to the second memory partition comprises rewriting the stream data that is classified as cold stream data into one or more memory blocks of the second memory partition having a program erase cycle (PEC) over a PEC threshold.

18. The data storage device of claim 10, wherein the second set of data storage parameters include one or more of:
writing the stream data that is classified as cold stream data using at least one of more pulses and more precise pulses when compared to the pulses associated with the first set of data storage parameters;
increasing a threshold voltage associated with a programmed state of a memory block associated with the stream data that is classified as cold stream data; and
decreasing a threshold voltage associated with an erased state of the memory block associated with the stream data that is classified as cold stream data.

19. A data storage device, comprising:
means for determining an access frequency of stream data stored by the data storage device, the stream data being associated with a first set of parameters;
means for classifying the stream data as at least one of hot stream data and cold stream data based, at least in part, on the determined access frequency;
means for rewriting the stream data that is classified as cold stream data to a primary storage means of the data storage device using a second set of parameters that are unique to stream data that is classified as cold stream data; and
means for rewriting the stream data that is otherwise classified to the primary storage means of the data storage device using the first set of parameters.

20. The data storage device of claim 19, wherein rewriting the stream data that is classified as cold stream data using the second set of storage parameters causes the stream data that is classified as cold stream data to be more resilient to one or more data storage issues when compared to when the stream data is written to the data storage device using the first set of data storage parameters.

\* \* \* \* \*